United States Patent [19]

Penney

[11] Patent Number: 5,473,361
[45] Date of Patent: Dec. 5, 1995

[54] CABLE TELEVISION TEST AND MEASUREMENT SYSTEM

[75] Inventor: Bruce J. Penney, Portland, Oreg.

[73] Assignee: Tektronix, Inc., Wilsonville, Oreg.

[21] Appl. No.: 214,995

[22] Filed: Mar. 21, 1994

Related U.S. Application Data

[63] Continuation of Ser. No. 5,685, Jan. 19, 1993, abandoned.

[51] Int. Cl.$^6$ ............................. H04N 7/10; H04N 7/14; H04N 7/173
[52] U.S. Cl. ............................................................. 348/6
[58] Field of Search ........................... 348/1–13, 183, 348/192; 455/67.1, 67.4, 6.1; 371/20.1, 20.2, 20.3, 20.4; H04N 7/173, 7/14, 7/10

[56] References Cited

U.S. PATENT DOCUMENTS

| 4,207,431 | 6/1980 | McVoy | 358/139 |
| 4,408,227 | 10/1983 | Bradley | 358/139 |
| 4,425,578 | 1/1984 | Haselwood et al. | 455/67.1 |
| 4,439,784 | 3/1984 | Furukawa et al. | 348/8 |
| 4,530,008 | 7/1985 | McVoy | 348/12 |
| 4,558,358 | 12/1985 | Onda | 358/86 |
| 4,648,123 | 3/1987 | Schrock | 455/67.4 |
| 4,700,222 | 10/1987 | Large et al. | 358/86 |
| 4,710,969 | 12/1987 | Fluck, Jr. et al. | 358/86 |
| 4,733,223 | 3/1988 | Gilbert | 358/86 |
| 5,073,822 | 12/1991 | Gumm et al. | 358/86 |
| 5,231,494 | 7/1993 | Wachob | 348/8 |
| 5,345,504 | 9/1994 | West, Jr. | 380/7 |

FOREIGN PATENT DOCUMENTS

| 2200085 | 8/1990 | Japan . |
| 4150183 | 5/1992 | Japan . |

OTHER PUBLICATIONS

"Characterization of Cable TV Networks as the Transmission Media for Data," Archer S. Taylor, IEEE Journal on Selected Areas in Communications, vol. SAC–3, No. 2 Mar. 1985.
"Automatic Monitoring of the Quality of Cable Television Pictures", Zhang et al, pp. III–549–III 552, IEEE ©1992.
"Remote Monitoring of Cable TV Headends", Bullinger, pp. 246–250, Hewlett Packard Feb. 22, 1992.
"Cable Testing for Advanced Television Systems", Walter S. Ciciora, pp. xi–xix, Jun. 9, 1989.
"Reflection Perceptibility Threshold on NTSC Signals and its Measurement Technique in a CATV System", Robert Chan, pp. 917–929, IEEE 1989.

Primary Examiner—Tommy P. Chin
Assistant Examiner—Vu Le
Attorney, Agent, or Firm—Francis I. Gray

[57] ABSTRACT

A test and measurement system for a cable television (CATV) system measures parameters of a broadband video signal at the headend of the CATV system. Characteristic data is generated from the measured parameters and combined with the broadband video signal for transmission over the distribution system of the CATV system. Also out of service video channels are detected at the headend, and a test sequence is combined with the broadband video signal for each out of service channel. In the field a receiver is coupled to a point in the distribution system to measure the parameters of the broadband video signal at that point. The parameters measured at the receiver are compared with the parameters measured at the headend, as derived from the transmitted characteristic data. The differences between the two sets of parameters are displayed to present a display of the characteristics of the CATV system, with out of service channels represented by the test sequences.

10 Claims, 1 Drawing Sheet

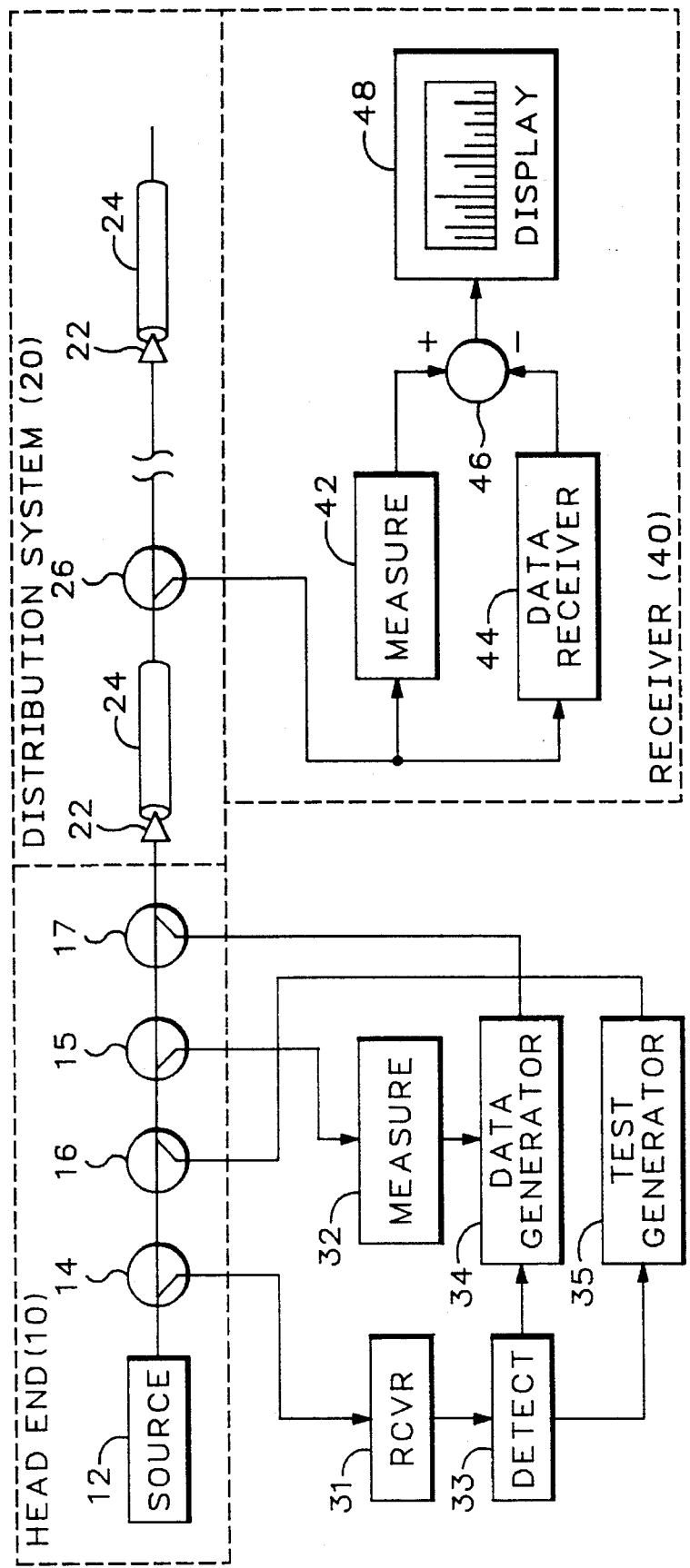

CABLE TELEVISION TEST AND MEASUREMENT SYSTEM

This is a continuation of application Ser. No. 08/005,685 filed Jan. 19, 1993 and now abandoned.

BACKGROUND OF THE INVENTION

The present invention relates to test and measurement of cable television (CATV) systems, and more particularly for a cable television test and measurement system that performs measurements at the cable headend, transmits the measurements as data over the cable television system, and compares the cable headend measurements with measurements performed in the field to determine characteristics of the cable television system.

Broadband CATV systems typically include active broadband amplifiers and passive connectors, splitters and taps, all interconnected by a significant amount of cable, either coaxial or fiber-optic. The majority of these components are in outside locations, exposed to temperature and weather extremes. Proper performance of such a CATV system is critical for customer satisfaction and continued regulatory compliance, and is affected by these extremes. Therefore the frequency response of the system, including all passive and active components, is important.

Existing CATV sweep systems for determining the characteristics of a CATV system use one of the following three common techniques:

1—measurement of the available television signals in the field. This technique is limited by level errors at the CATV headend.
2—measurement in the field of a test signal inserted at the headend in a guardband between channels. This technique fails because common television receivers have inadequate selectivity to reject the test signal.
3—measurement in the field of a low-level in-band test signal. This technique causes interference because sound carrier demodulation depends on video carrier presence.

The approach for determining frequency response by injecting a test signal at the headend of the CATV system has the test signal sweeping across the entire system bandwidth. Simultaneously the signal amplitude is measured at various points along the system to determine system gain and flatness. Historically high level, low level, intermediate level, and even "sweepless" sweep approaches have been tried. The difficulty with these approaches lie not in actually performing the measurements, but rather in performing them while the system is operating without degrading the video signals being transmitted on the system. All these approaches suffer from various shortcomings including:

* interference with cable signals;
* insufficient "sweep-to-noise" after several amplifiers;
* delayed response leading to "rubber screwdriver" effect; and
* too few data points across the system bandwidth.

One solution, incorporated in the 2721/2722 Non-interfering Sweep System manufactured by Tektronix, Inc. of Beaverton, Oreg., United States of America, is to transmit short test pulses, approximately 8 microseconds in duration, during the vertical blanking interval of the video signals being carded by the CATV system. Since there is no video information transmitted during the vertical blanking interval, the picture quality theoretically is unaffected. The test pulse amplitude is set close to that of the system carriers, such as 6 dB down from the horizontal sync tip amplitude, so the pulses do not get lost in system noise. The measured amplitude of these pulses are compiled to show the frequency response of the CATV system.

Once the measuring signal, which is generally an RF pulse, is inserted into the vertical interval, the question becomes one of determining an appropriate amplitude so the sweeper is truly non-interfering. If the amplitude of the RF pulse is set too large, it causes interference in the sound channel of the customer's set that sounds like ignition noise. On the other hand if the amplitude is set too small, the measured results have uncertainties caused by interference from the video signal in the channel being measured.

The mechanism of sound channel interference is fairly straight forward. Consumer receivers commonly recover sound information using an intercarrier process that is critically dependent upon the phase relationship between the video and audio carriers. When the customer's set receives a video signal together with the RF pulse, it treats the RF pulse as if it were part of the video signal. Since the added RF pulse is not phase coherent with the video carrier, it introduces phase errors into the intercarrier sound demodulation process. If the amplitude of the RF pulse with respect to the video carrier is too large, the resulting phase errors cause some consumer receivers to exhibit interference effects. These effects may be noticed as a buzz caused by the RF test pulse. In the case of very short pulses, such as the RF pulse, the buzz is reduced to a "pop."

A further potential problem with sending a signal that exceeds sync tip amplitude is the compression and distortion it causes in the customer's receiver. There are no guarantees of how much extra amplitude over the sync tip level the receiver's IF output stage can handle. The receiver's AGC loop may incorrectly set the video signal in the IF stage. Thus the RF pulse amplitude should be low enough so that receiver system standards are not violated. An attempt to address this problem is disclosed in U.S. Pat. No. 5,233,418 issued Aug. 3, 1993 to Linley F. Gumm et al entitled "CATV Sweep System Using a Gated Receiver." Another attempted solution to the problem of CATV system testing on a non-interfering basis is disclosed in U.S. Pat. No. 4,408,227 issued to Bradley on Oct. 4, 1983 entitled "Method and Apparatus for Television Distribution System Sweep Testing." The Bradley system uses time division multiplexing between the test signal and the video signal as a means of eliminating interference to the video signal due to testing. The video signal provides synchronizing signals that enable the video signal to be suppressed during the vertical interval and the test signal to be inserted in its place. At the receiver the process is reversed to demultiplex out the test signal for display. However, the Bradley system causes a loud buzz on the customer's receiver due to dropping the sound carrier when the test signal is multiplexed with the video signal. This is similar to the buzz caused by intercarrier phase distortion mentioned above.

All of the above fail to address the phase shift in the video carrier caused by the addition of the RF test signal to the video signal. This phase shift introduces a similar phase shift into the sound signal when the sound carrier is demodulated. The result is still a distortion that occurs on the sound channel at the customer's television receiver. Further with proposed digital television standards there is no vertical interval into which test signals may be inserted.

What is desired is a cable television test and measurement system that determines the characteristics of the system in-service without introducing any video or sound distortions into the television receiver regardless of whether the video is analog or digital.

SUMMARY OF THE INVENTION

Accordingly the present invention provides a cable television (CATV) test and measurement system that determines the characteristics of the system without injecting any interfering test signals into the system. At the CATV headend desired measurements, such as the rms amplitude of each channel carrier signal, are made of the video signal. These measurements are encoded for data transmission over a data channel that may be a spare or special channel of the CATV distribution system. In the field the video signal is measured for the same parameters as at the headend, and compared with the parameter values transmitted over the data channel. The differences between the measured and transmitted parameter values are displayed to indicate the characteristics of the CATV system. To assure that there are no gaps in the display, since not all channels may be used by a particular CATV system, a test sequence is automatically inserted into those channels that are not in service. The test sequence is synchronized at the receiver using data in the data channel.

The objects, advantages and other novel features of the present invention are apparent from the following detailed description when read in view of the appended claims and attached drawing.

BRIEF DESCRIPTION OF THE DRAWING

The FIGURE is a block diagram of a cable television system according to the present invention.

DESCRIPTION OF THE PREFERRED EMBODIMENT

Referring now to the FIGURE a cable television (CATV) system has a headend 10 and a distribution system 20. At the headend 10 is a source 12 of a broadband video signal having a plurality of video channels for transmission via line amplifiers 22 and cables 24 of the distribution system 20 to customers' television receivers. A splitter 15 in the headend 10 provides a sample of the broadband video signal output from the headend for processing according to the present invention. The signal from the splitter 15 is input to a measurement system 32 that performs measurements for each channel of the signal. The measurements may be RF measurements, such as rms amplitude of the carrier for each channel, or may be normal measurements of the demodulated video, such as differential phase and gain, or both. The measurements are input to a data generator 34 for encoding and modulating into a data signal on a data channel that may be either a channel not in service or a special channel. The data measurements are a function of the type of channel being measured, either analog or digital, to accommodate CATV systems that may have both analog and digital channels. The data signal is input to a uni-directional output combiner 17 in the headend 10 for transmission over the distribution system 20.

The signal from another splitter 14 coupled to the source 12 is input to a programmable receiver 31. A detector 33 is coupled to the output of the programmable receiver 31 to determine which channels of the CATV system are not in service. A test sequence generator 35 is coupled to the output of the detector 33. The test sequence generator 35 outputs a test sequence for each channel that is detected as being out of service. The test sequence also may be input to the measurement system 32 for processing together with the signal from the source 12 by coupling the output of the test sequence generator 35 via another uni-directional combiner 16 to the headend output prior to the first splitter 15. The data generator 34 also is coupled to the detector 33 to provide, as part of the data signal, information for synchronizing the test sequence at the receiving end.

In the field a receiver 40 is coupled to the distribution system 20 at a splitter 26. A measurement system 42 in the receiver 40, similar to the measurement system 32 at the headend 10, measures the same parameters of the broadband video signal as were measured at the headend. A data receiver 44 receives the data signal from the data channel and decodes the parameters measured at the headend 10. A comparator 46, which may be either a hardware or microprocessor based circuit, essentially subtracts the headend and receiver measured parameters for each channel from each other. The resulting differences are then displayed appropriately on a display device 48 to give a visual indication of the CATV system performance for each channel, including the out of service channels. Clearly the display might also be a printout or other display of measured results.

Thus the present invention provides a CATV test and measurement system that performs in-service testing of a CATV system on a non-interfering basis by measuring the parameters of the broadband video signal at the headend, including test sequences inserted into out of service channels, transmitting the parameters and synchronizing information over a data channel, measuring the parameters of the broadband video signal at a point in the distribution system, and displaying the differences between the parameters as measured at the headend and at the point in the distribution system for each channel.

What is claimed is:

1. A test and measurement system for determining characteristics of a cable television system of the type having a source of a broadband video signal at a headend representing a plurality of video channels, the video channels including both in-service and out of service video channels, and a distribution system for transmitting the broadband video signal to television receivers comprising:

means for measuring at the headend specific parameters of the broadband video signal for each of the video channels to produce measured headend parameters;

means for transmitting the measured headend parameters as a data signal over the distribution system;

means for measuring at a point in the distribution system the specific parameters of the broadband video signal for each of the video channels to produce measured receiver parameters; and means for comparing the measured receiver parameters with the measured headend parameters contained in the data signal to determine the characteristics of the cable television system.

2. The system as recited in claim 1 further comprising means responsive to the broadband video signal for automatically inserting a test sequence into each of the out of service video channels of the broadband video signal so that the characteristics determined by the comparing means include both the in-service and out of service video channels.

3. The system as recited in claim 2 wherein the inserting means comprises:

means for receiving the broadband video signal at the headend;

means for detecting from the output of the receiving means the out of service video channels;

means for generating the test sequence for each of the out of service video channels indicated by the detecting means; and means for combining the test sequences with the broadband video signal for transmission over the distribution system.

4. The system as recited in claim 2 wherein the transmitting means comprises:

means for generating the data signal in response to the measured headend parameters; and means for combining the data signal with the broadband video signal for transmission over the distribution system.

5. The system as recited in claim 4 wherein the comparing means comprises:

means for receiving the data signal to reproduce the measured headend parameters;

means for subtracting the measured receiver parameters from the measured headend parameters to obtain a difference parameter for each of the video channels; and means for displaying the difference parameters to determine the characteristics of the cable television system.

6. A test and measurement system for determining characteristics of a cable television system of the type having a source of a broadband video signal at a headend representing a plurality of video channels, the video channels including both in-service and out of service video channels, and a distribution system for transmitting the broadband video signal to television receivers comprising:

means responsive to the broadband video signal for automatically inserting a test sequence into each of the out of service channels of the broadband video signal;

means for transmitting over the distribution system a data signal representing specific parameters of the test sequences as measured at the headend;

means for measuring the specific parameters of the test sequences at a point in the distribution system to determine measured received parameters for each of the out of service channels; and means for comparing the measured received parameters with the specific parameters contained in the data signal to determine the characteristics of the cable television system.

7. The system of claim 6 further comprising means for measuring at the headend parameters of the broadband video signal for each video channel to produce measured headend parameters, the measured headend parameters being input to the transmitting means for transmission as the data signal.

8. The system of claim 6 wherein the inserting means comprises:

means for receiving the broadband video signal at the headend;

means for detecting from the output of the receiving means each of the out of service video channels;

means for generating the test sequence for each of the out of service video channels indicated by the detecting means; and means for combining the test sequences with the broadband video signal for transmission over the distribution system.

9. The system of claim 6 wherein the transmitting means comprises:

means for generating the data signal for each of the test sequences; and means for combining the data signal with the broadband video signal for transmission over the distribution system.

10. The system of claim 9 wherein the comparing means comprises:

means for receiving the data signal to reproduce the measured parameters;

means for subtracting the measured received parameters from the measured parameters to obtain a difference parameter for each of the video channels; and means for displaying the difference parameters to determine the characteristics of the cable television system.

* * * * *